Nov. 16, 1965 K. CLUNIS 3,218,620

TWO TRACK REPRODUCING SYSTEM WITH TWO RECORDED LEVELS UTILIZING A VARIABLE IMPEDANCE ELEMENT

Original Filed Aug. 15, 1962

INVENTOR:
Kenneth Clunis

By Smyth, Roston & Pavitt
Attorneys.

United States Patent Office 3,218,620
Patented Nov. 16, 1965

3,218,620
TWO TRACK REPRODUCING SYSTEM WITH TWO RECORDED LEVELS UTILIZING A VARIABLE IMPEDANCE ELEMENT

Kenneth Clunis, Stillwater, Minn., assignor to Minnesota Mining and Manufacturing Company, St. Paul, Minn., a corporation of Delaware Continuation of application Ser. No. 217,184, Aug. 15, 1962. This application Nov. 16, 1964, Ser. No. 413,392
9 Claims. (Cl. 340—174.1)

This application is a continuation of the application of my copending application, Serial No. 217,184, filed August 15, 1962.

This invention relates to a transducing system. More specifically, the invention relates to the recording and reproducing of information over a greater dynamic range than is possible with the prior art systems. For example, the invention has application to a magnetic recording and reproducing system so as to increase its normal dynamic range of approximately 55 decibels to at least 75 decibels.

Information, such as audio information, has a dynamic range which is determined by the difference between the amplitude signal of lowest level included in the information and the amplitude signal of highest level included in the information. This difference often is greater than the maximum dynamic range which can be tolerated in the recording and reproducing system.

The greatest amplitude signal which may be recorded on a magnetic medium is a function of the saturation of the magnetic material on the medium. As saturation is reached, the nonlinearity of the response of the magnetic medium causes the recorded signal to suffer appreciable distortion. The lowest amplitude signal which may be recorded is determined by the minimum signal-to-noise ratio which can be tolerated in the reproducing of the information. In the prior art transducing system, the above factors generally limit the dynamic range of the system to a particular range such as approximately 55 decibels.

The information, however, often has a greater amplitude range than that which may be recorded and reproduced by the prior art systems. For example, the amplitude range of symphonic music often exceeds 55 decibels. The prior art systems, therefore, have had to compress the information into the range which can be recorded and reproduced. This unfortunately results in a significant loss of enjoyment to the listener since the differences in level of symphonic music are often an important part of the musical content. The sacrifice, however, must be made with the prior art systems in order to insure fidelity and low noise in the recording and reproducing system.

In copending application Serial No. 214,052, filed August 1, 1962, by John T. Mullin, systems are disclosed an claimed for recording the information at two levels on the recording medium, one level being appreciably lower than the other level. For example, the information may be recorded on two tracks on the recording medium, each track containing the same information at a different recording level. Subsequently the information recorded at the higher level is reproduced as a normal output signal. This output signal is monitored to determine when the information has exceeded the particular amplitude value which can be tolerated by the recording medium without producing a saturation of the signals recorded on the medium. When the information recorded at the higher level exceeds the particular value, the reproducing system switches to the information recorded at the lower level to produce an output signal from such information. At the lower level, the information is within the normal recording range of the magnetic medium and can be reproduced without significant distortion. The final output signal from the reproducing system is, therefore, a combination of the higher level signal at particular times and the lower level signal at other times. The two level signals are equalized to give a constant level output signal which has a total greater dynamic range than is possible with the prior art systems.

This invention encompasses an improvement in the reproducing system of the above named application, Serial No. 214,052 of John T. Mullin and includes simplified circuitry for switching between the two levels of information. The invention uses a single variable impedance element controlled in either one of two states to determine which level of received information is passed as an output signal from the reproducing system.

Figure 1:
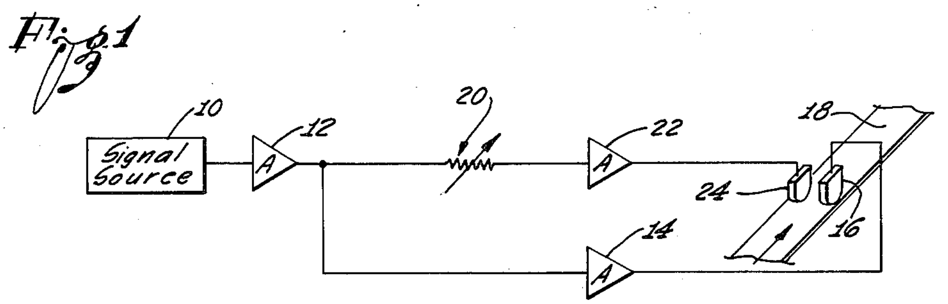
FIGURE 1 is a block diagram of a system for recording information on two tracks on a recording medium with each track containing the information at a different recorded level.

In FIGURE 1, a signal source 10 provides information signals. The signal source 10 may be, for example, a microphone which picks up audio oscillations and converts them into electrical signals. The information is applied to an amplifier 12 which provides an increased intensity of the information at the output of the amplifier 12. The information is then split into two paths. One path passes directly through a recording amplifier 14 for recording on a first track on a magnetic medium by a recording head 16. The magnetic medium is generally designated as 18 and may consist of a recording tape having magnetic particles deposited on an acetate or Mylar base.

The second path from the amplifier 12 consists of an adjustable attenuator 20 and a second recording amplifier 22. The recording amplifier 22 applies the signal to a second recording head 24 to record a second track of information on the magnetic medium 18. The attenuator 20 is adjusted so as to provide a recording of the information by the recording head 24 at an appreciably lower level than the recording of the information by the recording head 16. For example, the attenuator 20 may be adjusted to provide a 20-decible difference in recording levels on the two tracks on the magnetic medium 18. The amplifiers 14 and 22 are recording amplifiers which provide the appropriate biases of the information so as to record the information with minimum distortion and noise on the recording medium 18.

Figures 2, 3:
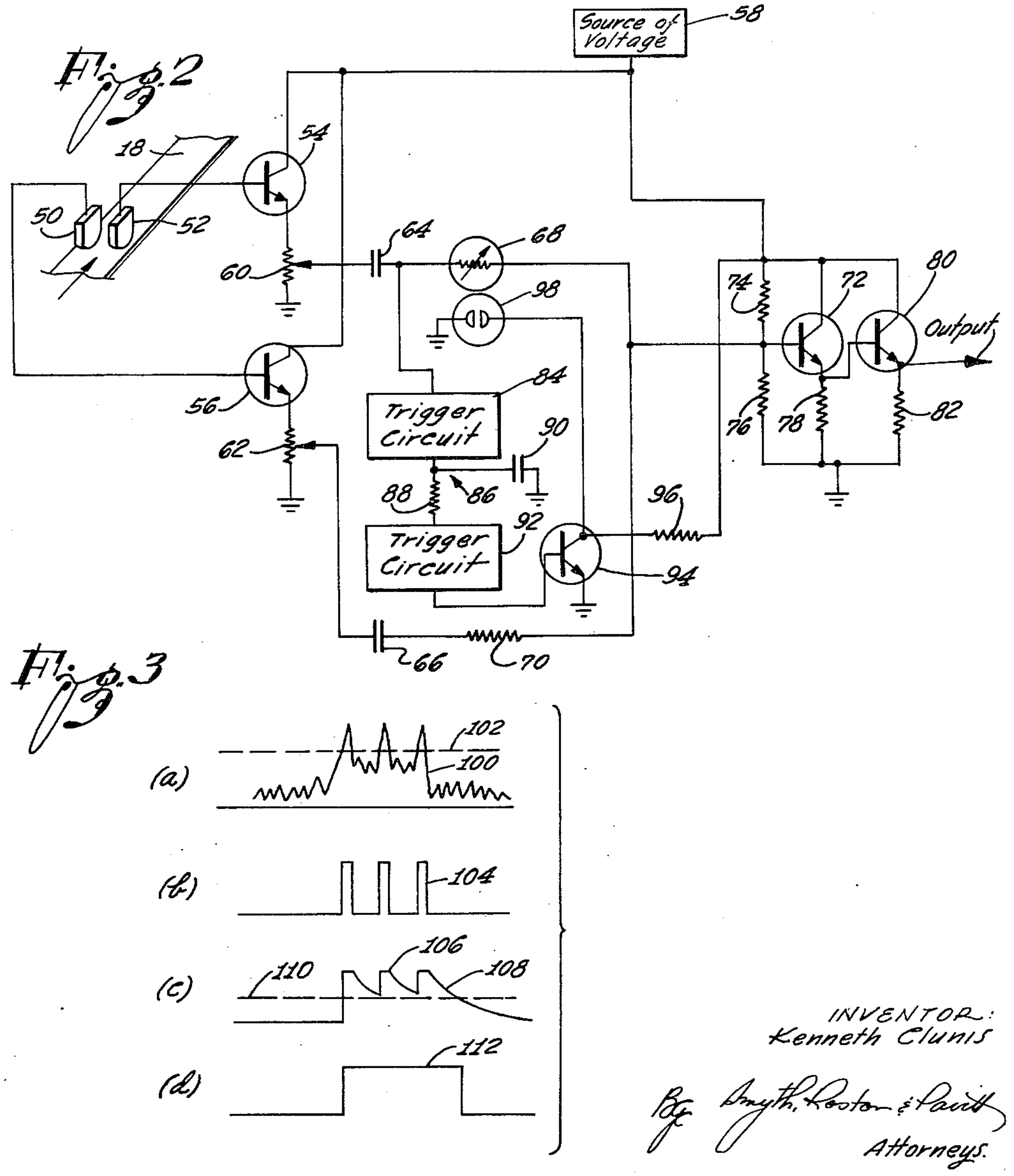
FIGURE 2 is a system, illustrated partly in block form and partly in schematic form, for reproducing the information recorded on the medium by the system shown in FIGURE 1.
FIGURE 3 illustrates signals produced at strategic terminals in the system of FIGURE 2.

FIGURE 2 illustrates a system for reproducing the information on the medium 18. Two heads 50 and 52 reproduce the information previously recorded on the two tracks on the magnetic medium 18. The information signal reproduced by the head 52 is applied to the base of a transistor 54. The information signal reproduced by the head 50 is applied to the base of a transistor 56. The transistors 54 and 56 may be of the same type, for example, a NPN 2N1985, and may provide a preamplification of the information contained on the medium 18.

The collectors of the transistors 54 and 56 have a common connection to a source 58 of supply voltage. The emitters of the transistors 54 and 56 are respectively connected to first end terminals of potentiometers 60 and 62. The second end terminals of the potentiometers 60 and 62 are coupled to a reference potential such as ground. Each potentiometer 60 and 62 may have a value in the order of 5 kilohms from the first end terminal to the second end terminal.

The movable arm of the potentiometer 60 is electrically common with one side of a coupling capacitor 64 and the movable arm of the potentiometer 62 is electrically common with one side of a coupling capacitor 66. The capacitors 64 and 66 may each have a value in the order of 10 microfarads and provide a coupling of the information from the transistors while blocking direct current. The information signal coupled through the capacitor 64 is applied to one terminal of a variable resistance 68. The resistance 68 may be sensitive to light and may have a variation approximately between 1 kilohm and 10 megohms. The photosensitive resistance 68 may be obtained from Raytheon Corporation under the trademark Raysistor. The information signal coupled through the capacitor 66 is applied to one terminal of a resistance 70 which may have a fixed value intermediate the two extreme values of the variable resistor 68. The resistor 70, for example, preferably has a value in the order of 220 kilohms.

The other terminals of the resistances 68 and 70 have a common juncture with the base of a transistor 72, which may be an NPN type 2N1974. Resistors 74 and 76 operate as a voltage divider circuit to provide an appropriate biasing at the base of the transistor 72. The resistors 74 and 76 are connected in series between the source 58 of voltage and the reference potential such as ground and may have values in the order of 4.7 megohms and 10 megohms, respectively. A resistor 78, which may have a value in the order of 470 kilohms, is electrically disposed between the emitter of the transistor 72 and the reference potential such as ground. The collector of the transistor 72 is directly connected to the source 58 of voltage.

The output from the transistor 72 is taken at the emitter and applied to the base of a second transistor 80, which may also be an NPN type 2N1974. The collector of the transistor 80 is also directly connected to the source 58 of voltage and has its emitter connected through a resistance 82 to the reference potential such as ground. The resistance 82 may have a value in the order of 4.2 kilohms. The output from the reproducing system is taken at the emitter of the transistor 80.

When the information is reproduced from the two tracks on the magnetic medium 18 by the reproducing heads 50 and 52, the information signals first pass through the amplifiers including the transistors 54 and 56. The information signals are subsequently coupled together after being modified by the impedance network including the resistors 68 and 70. The impedance network substantially attenuates either one or the other of the information signals. Because of this, the unattenuated signal is amplified to appear as the output from the reproducing system. The value of the resistor 68 is the determining factor as to which information signal is the output and the value of the resistor 68 is correlated with the amplitude of the information recorded at the higher level.

The input to trigger circuit 84 is connected to receive the output from the coupling capacitor 64 in representation of the information recorded at the relatively high level by the transducer 16 on the magnetic medium 18. The trigger circuit 84 is designed to be turned on when the input is above a particular amplitude value. The particular value corresponds to the maximum amplitude of the information which can be recorded without having a significant saturation of the magnetic particles on the magnetic medium 18.

FIGURE 3(*a*) illustrates an information signal 100 which may be used as an input to the trigger circuit 84. The signal 100 is shown as a series of jagged lines which represent the level of the information at successive instants of time. A dotted line 102 represents the level at which saturation occurs in the recording medium and corresponds to the triggering value of the circuit 84.

FIGURE 3(*b*) illustrates the output from the trigger circuit 84. It will be noted that during the periods when the information is above the triggering value, the trigger circuit 84 produces pulses 104. The pulses 104 from the trigger circuit 84 are applied to a long time constant circuit 86 which consists of a resistor 88 and a capacitor 90. The output from the long time constant circuit 86 is illustrated at 106 in FIGURE 3(*c*). The capacitor 90 is charged by the application of the pulses 104 and is discharged at a slow rate toward zero in the times between the occurrence of the pulses. This causes the signal 106 to decrease in amplitude in the periods between the pulses 104, as illustrated at 108 in FIGURE 3.

The output signal 106 from the long time constant circuit 86 is applied as an input to a second trigger circuit 92. A dotted line 110 in FIGURE 3(*c*) illustrates the triggering level for the second trigger circuit 92. The long time constant circuit 86 prevents the amplitude of the signal 106 from decreasing at an excessively rapid rate. The trigger circuit 92, therefore, produces a continuous output pulse 112 during the periods when the information signal 100 generally has a high level notwithstanding momentary decreases in the amplitude of the information signal below the level 100.

The pulse 112 from the trigger circuit 92 is applied to the base of a transistor 94. As shown in FIGURE 3(*d*), the pulse 112 controls the operation of the transistor 94 in a switching circuit. The collector of the transistor 94 is connected through a resistor 96 to the source 58 of voltage. The emitter of the transistor 94 is electrically disposed at the reference potential such as ground. When no signal appears on the base of the transistor 94, the transistor is biased to a non-conductive state, and a positive voltage is present on the collector of the transistor 94. This voltage is applied directly across a neon bulb 98. The bulb 98 is optically coupled to the photosensitive resistance 68 to control the value of the resistance 68.

When the neon bulb is on, the photosensitive resistance 68 has a value of approximately 1 kilohm. Since the neon bulb 98 is on when there is no output signal from the trigger circuit 92, the normal condition is to have the resistance 68 at its low value. During this period of time, the information from the transistor 54 passes through a low impedance path including the resistance 68 to the transistor 72 so as to receive a negligible attenuation. The information from the transistor 56 is, however, effectively shorted by the low impedance path from the transistor 54 since the impedance of the resistance 70 is considerably higher than that of the resistance 68. This substantially attenuates all the information recorded at the lower level such that the output from the reproducing system is the information recorded at the higher level by the head 16 in FIGURE 1.

When the information recorded at the higher level by the head 16 exceeds the maximum permissible value, the trigger circuit 92 produces the output pulse 112 shown in FIGURE 3(*d*). The output pulse 112 biases the transistor 94 to a state of conductivity and causes the voltage at the collector of the transistor 94 to fall to the reference potential such as ground. Since there is no voltage across the neon tube, the tube becomes extinguished and causes the impedance of the photosensitive resistor 68 to change to a value of approximately 10 megohms. During this condition, the information from the transistor 56 passes substantially unattenuated to the transistor 72. The information coupled from the transistor 54, however, is severely attenuated because of the fact that the impedance of the photosensitive resistance 68 is now substantially greater than that of the resistor 70. This causes the output signal from the reproducing system to contain substantially no portion of the signal from the transistor 54. The information appearing at the output of the transistor 80 is, therefore, at a level corresponding to a minimum distortion in the recording system. Also, the dynamic range of the recording system is increased by an amount equal to the difference in levels between the higher and lower level information on the recording medium.

It will be appreciated that the variable potentiometers 60 and 62 are adjusted so that the output at the transistor 80 is equalized no matter which level or recording is coupled through the impedance network. Also an auxiliary amplifier may be used in the path containing the information recorded at the lower level to equalize the output at the transistor 80.

It will be appreciated that this application has been disclosed with reference to particular embodiments but it will be apparent to those skilled in the art that other adaptations and modifications may be made without departing from the concepts of the invention and the invention is therefore only to be limited by the appended claims.

I claim:

1. In combination in a system for reproducing information contained on a recording medium with the information recorded on the medium at a plurality of recording levels, first means operatively coupled in the recording medium and responsive to a first level of the information for producing a first signal having characteristics in accordance with the information, second means operatively coupled to the recording medium and responsive to a second level of the information for producing a second signal having characteristics in accordance with the information, third and fourth means each constituting impedance means and having first and second terminals with the first terminals of the third and fourth impedance means coupled together at a common junction and with the second terminals of the third and fourth impedance means operatively coupled to the first and second means respectively to provide an output signal at the common junction composed of the first and second signals, the third impedance means being variable between a first value and a second relatively higher value and the fourth impedance means being fixed at a value intermediate the first and second values of the third variable impedance means, and means operatively coupled to the third impedance means for varying the third impedance means between the first and second values to change the relative proportions of the first and second signals which form the output signal in accordance with the variation of the third impedance means.

2. In combination in a system for reproducing information contained on a recording medium with the information recorded on the medium at a plurality of recording levels, first means operatively coupled to the recording medium and responsive to a first level of the information for producing a first signal having characteristics in accordance with the information, second means operatively coupled to the recording medium and responsive to a second level of the information for producing a second signal having characteristics in accordance with the information, third and fourth means each constituting impedance means and having first and second terminals with the first terminals of the third and fourth impedance means coupled together at a common junction and with the second terminals of the third and fourth impedance means operatively coupled to the first and second means respectively to provide an output signal at the common junction composed of the first and second signals, the third impedance means being a photosensitive resistor and being variable between a first value of resistance and a second relatively higher value of resistance and the fourth impedance means having a resistance value intermediate and first and second resistance values of the third impedance means, and light means operatively coupled to the third impedance means for producing light of a first and second intensity for varying the third impedance means between the first and second values to change the relative proportions of the first and second signals which form the output signals in accordance with the variation of the third impedance means.

3. In combination in a system for reproducing information contained on at least two tracks on a recording medium with a first track containing the information at an amplitude level relatively higher than the same information contained on a second track, first means operatively coupled to the first track on the recording medium for reproducing the relatively higher level information on the first track, second means operatively coupled to the second track on the recording medium for reproducing the relatively lower level information on the second track, third and fourth means each constituting impedance means, said impedance means being operatively coupled to the first and second means for coupling the higher and lower level information to a common point and having one of the impedance means variable between a first value and a relatively higher second value and having the other impedance means fixed at a value intermediate the first and second values of the one impedance means, fifth means operatively coupled to the first means and responsive to the higher level information for producing a control signal having characteristics in accordance with values of the higher level information above and below a particular value, and sixth means operatively coupled to the one variable impedance means and responsive to the control signal for varying the one impedance means between the first and second values to provide a relative attenuation of the higher level information signal to the lower level information signal in accordance with the characteristics of the control signal.

4. The combination of claim 3 wherein the one variable impedance means is a photosensitive resistor and wherein the sixth means is a source of light.

5. In combination in a system for reproducing information contained on at least two tracks on a recording medium with a first track containing the information at an amplitude level relatively higher than the same information contained on a second track, first means operatively coupled to the first track on the recording medium for reproducing the relatively higher level information on the first track, second means operatively coupled to the second track on the recording medium for reproducing the relatively lower level information on the second track, third and fourth means each constituting impedance means, said impedance means being operatively coupled to the first and second means for coupling the higher and lower level information to a common point and having the third impedance means variable between a first value and a relatively higher second value and having the fourth impedance means fixed at a value intermediate the first and second values of the third impedance means, fifth means operatively coupled to the third variable impedance means and responsive to values of the higher level information above a particular value for maintaining the third variable impedance means at the first value and responsive to values of the higher level information below the particular value for maintaining the third variable impedance means at the second relatively higher value.

6. In combination in a system for reproducing information contained on a recording medium with the information recorded on the medium at a plurality of recording levels, first means operatively coupled to the recording medium and responsive to a first level of the information for producing a first output signal having characteristics in accordance with the information, second means operatively coupled to the recording medium and responsive to a second level of the information for producing a second output signal having characteristics in accordance with the information, third means operatively coupled to the first means for providing an impedance variable between a first value and a second relatively higher value, fourth means operatively coupled to the second means for providing a fixed impedance having a value intermediate the first and second values of the variable impedance means, fifth means operatively coupled to the third and fourth means for providing an output means, and sixth means operatively coupled to the third means for maintaining the variable impedance means at its first value for substantially coupling all of the first output signal to the output means and for substantially attenuating all of the second output signal and for maintaining the variable impedance at its second relatively higher value for coupling substantially all of the second output signal to the output means and for substantially attenuating all of the first output signal.

7. In combination in a system for reproducing information contained on at least two tracks on a recording medium with a first track containing the information at a relatively higher level than the same information contained on the other track, first means operatively coupled to the first track on the recording medium for reproducing the relatively higher level information on the first track, second means operatively coupled to the second track on the recording medium for reproducing the relatively higher level information on the second track, third means operatively coupled to the first means and responsive to the higher level information for producing a control signal having characteristics in accordance with values of the higher level information above and below a particular value, fourth means operatively coupled to the first means and responsive to the control signal for providing an impedance variable between a first value and a second relatively higher value in accordance with the characteristics of the control signal, fifth means operatively coupled to the second means for providing a fixed impedance having a value intermediate the first and second values of the variable impedance means, and sixth means operatively coupled to the fourth and fifth impedance means for providing an output means and for substantially coupling all the higher level information to the output means and for substantially attenuating all the lower level information when the variable impedance means is at its relatively lower value and for substantially coupling all the lower level information to the output means and for substantially attenuating all the higher level information when the variable impedance means is at its relatively higher value.

8. In combination in a system for reproducing information contained on at least two tracks on a recording medium with a first track containing the information at an amplitude level relatively higher than the same information contained on a second track, first means operatively coupled to the first track on the recording medium for reproducing the relatively higher level information on the first track, second means operatively coupled to the second track on the recording medium for reproducing the relatively lower level information on the second track, third means operatively coupled to the first means and responsive to the higher level information for producing a control signal having a first value for amplitudes of the higher level information above a particular amplitude and having a second value for amplitudes of the higher level information below the particular amplitude, fourth means for providing an output terminal, fifth and sixth means each constituting impedance means, said impedance means being operatively coupled to the first and second means respectively and to the output terminal to form a branch circuit for individually coupling the first and second means to the output terminal, the fifth impedance means being variable and responsive to the control signal and having a first impedance value for the first value of the control signal and a second impedance value relatively lower than the first for the second value of the control signal, and the sixth impedance means having a fixed value intermediate the first and second impedance values of the fifth impedance means.

9. In combination in a system for reproducing information contained on at least two tracks on a recording medium with a first track containing the information at an amplitude level relatively higher than the same information contained on a second track, first means operatively coupled to the first track on the recording medium for reproducing the relatively higher level information on the first track, second means operatively coupled to the second track on the recording medium for reproducing the relatively lower level information on the second track, third means operatively coupled to the first means and responsive to the higher level information for producing a control signal having a first value for amplitudes of the higher level information above a particular amplitude and having a second value for amplitudes of the higher level information below the particular amplitude, a source of light operatively coupled to the third means and responsive to the control signal to produce light energy with the control signal at the second value and to extinguish the light energy with the control signal at the first value, fourth means for providing an output terminal, photosensitive impedance means operatively coupled to the source of light and to the output terminal for coupling the higher level information reproduced by the first means to the output terminal, the photosensitive impedance means responsive to the source of light and having a first impedance value with the reception of light energy and a second impedance value relatively lower than the first with the absence of light energy, and impedance means operatively coupled to the output means and having a fixed value intermediate the first and second impedance values of the photosensitive impedance means for coupling the lower level information reproduced by the second means to the output terminal.

No references cited.

IRVING L. SRAGOW, *Primary Examiner.*